United States Patent
Inoue et al.

(10) Patent No.: US 6,721,140 B2
(45) Date of Patent: Apr. 13, 2004

(54) MAGNETORESISTIVE DEVICE AND METHOD OF MANUFACTURING SAME AND THIN-FILM MAGNETIC HEAD AND METHOD OF MANUFACTURING SAME

(75) Inventors: Tohru Inoue, Tokyo (JP); Shigeki Tanemura, Tokyo (JP); Koichi Terunuma, Tokyo (JP)

(73) Assignee: TDK Corporation, Tokyo (JP)

( * ) Notice: Subject to any disclaimer, the term of this patent is extended or adjusted under 35 U.S.C. 154(b) by 218 days.

(21) Appl. No.: 09/987,732

(22) Filed: Nov. 15, 2001

(65) Prior Publication Data

US 2002/0097531 A1 Jul. 25, 2002

(30) Foreign Application Priority Data

Nov. 22, 2000 (JP) .......................................... 2000-355311

(51) Int. Cl.[7] .................................................. G11B 5/39
(52) U.S. Cl. ........................................ 360/323; 360/320
(58) Field of Search ................................ 360/317, 319, 360/320, 323

(56) References Cited

U.S. PATENT DOCUMENTS

| | | | |
|---|---|---|---|
| 5,375,022 A | | 12/1994 | Gill et al. |
| 5,465,186 A | * | 11/1995 | Bajorek et al. ............. 360/323 |
| 5,559,051 A | * | 9/1996 | Voldman et al. ............... 438/3 |
| 5,757,591 A | | 5/1998 | Carr et al. |
| 6,163,437 A | | 12/2000 | Inage et al. |
| 2002/0085317 A1 | * | 7/2002 | Hoshino et al. ............. 360/320 |

FOREIGN PATENT DOCUMENTS

| | | | | |
|---|---|---|---|---|
| EP | 651375 A1 | * | 5/1995 | ............ G11B/5/40 |
| JP | A 61-77114 | | 4/1986 | |
| JP | A 6-60338 | | 3/1994 | |
| JP | A 7-65324 | | 3/1995 | |
| JP | A 7-85422 | | 3/1995 | |
| JP | 07254113 A | * | 10/1995 | ............ G11B/5/39 |
| JP | 08045033 A | * | 2/1996 | ............ G11B/5/39 |
| JP | 08227508 A | * | 9/1996 | ............ G11B/5/39 |
| JP | A 8-315321 | | 11/1996 | |
| JP | A 10-11717 | | 1/1998 | |
| JP | A 10-255235 | | 9/1998 | |
| JP | A 10-269534 | | 10/1998 | |
| JP | A 11-45423 | | 2/1999 | |
| JP | 11096521 A | * | 4/1999 | ............ G11B/5/39 |
| JP | A 11-316915 | | 11/1999 | |
| JP | A 2000-76626 | | 3/2000 | |
| JP | 2000076626 A | * | 3/2000 | ............ G11B/5/39 |
| JP | 2001056913 A | * | 2/2001 | ............ G11B/5/39 |

OTHER PUBLICATIONS

"Magnetoresistive Head with Integrated Varistor Employing Combined Varistor, Antiferromagnet Seed/Gap and Grounded First Shield," Apr. 1, 2000, IBM Technical Disclosure Bulletin, Iss. No. 432, p. 751.*

* cited by examiner

Primary Examiner—William Klimowicz
(74) Attorney, Agent, or Firm—Oliff & Berridge, PLC

(57) ABSTRACT

A read head includes: an MR element that detects a magnetic field; a pair of electrode layers for feeding a sense current to the MR element; and a bottom shield layer and a top shield layer that sandwich and shield the MR element and the electrode layers; a bottom insulating layer disposed between the MR element/the electrode layers and the bottom shield layer; a top insulating layer disposed between the MR element/the electrode layers and the top shield layer; a bottom semiconductor layer that is made up of a single layer and disposed between the electrode layers and the bottom shield layer, for connecting the electrode layers and the bottom shield layer; and a top semiconductor layer that is made up of a single layer and disposed between the electrode layers and the top shield layer, for connecting the electrode layers and the top shield layer.

6 Claims, 10 Drawing Sheets

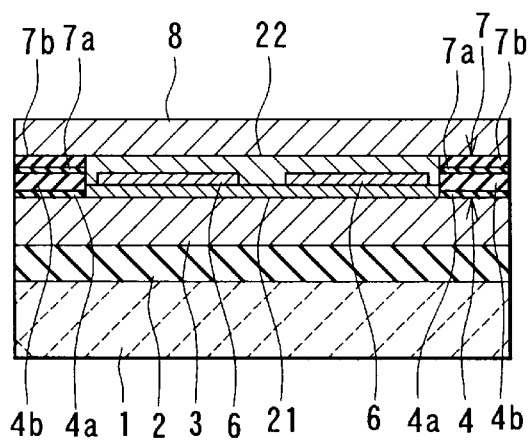
FIG. 3
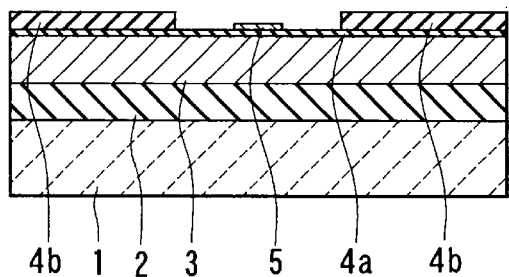 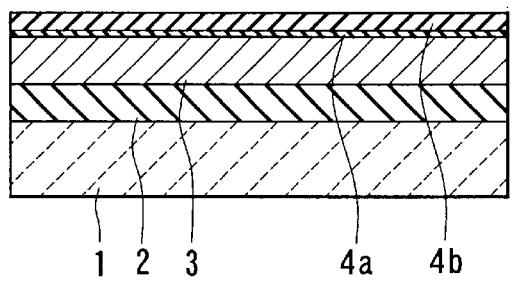
FIG. 4A             FIG. 4B

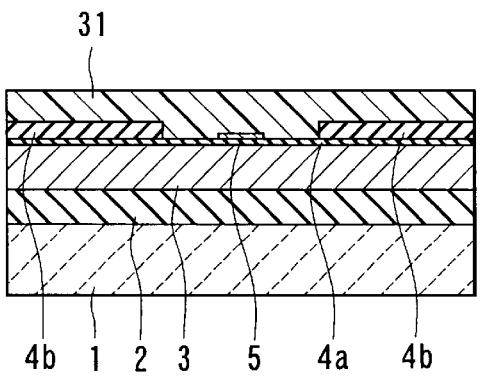
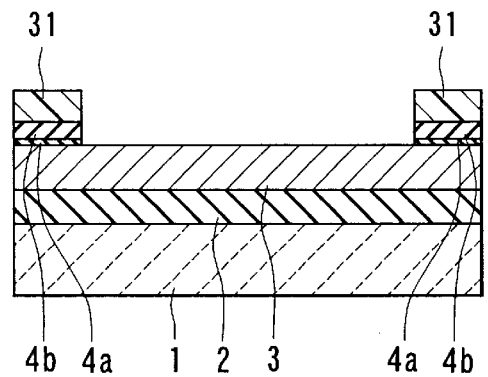
FIG. 5A                    FIG. 5B
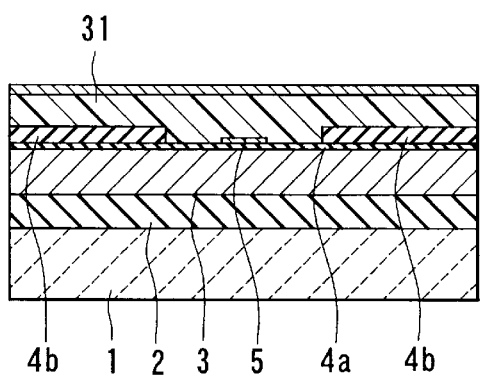
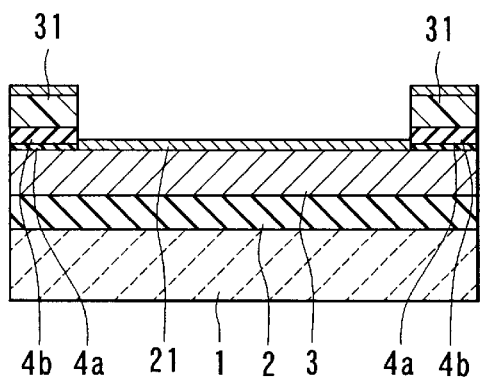
FIG. 6A                    FIG. 6B

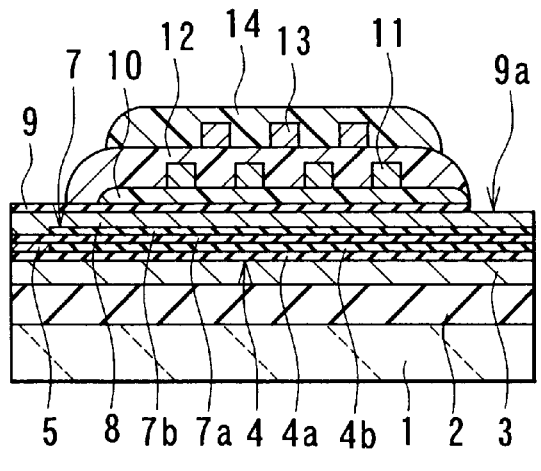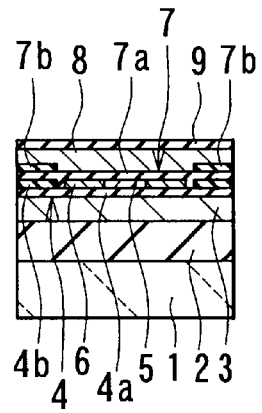
FIG. 13A     FIG. 13B
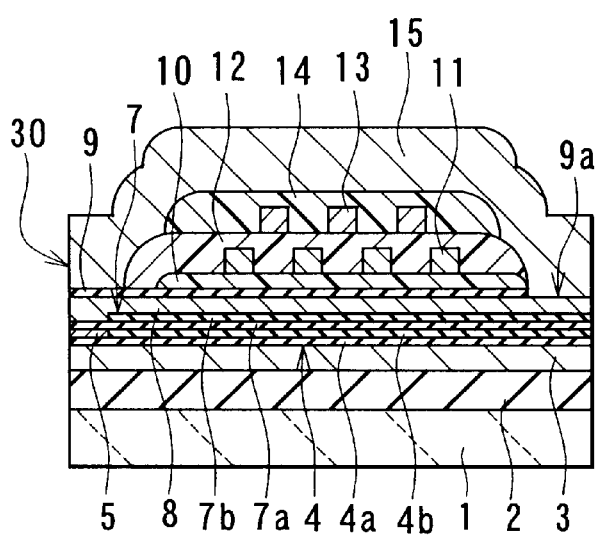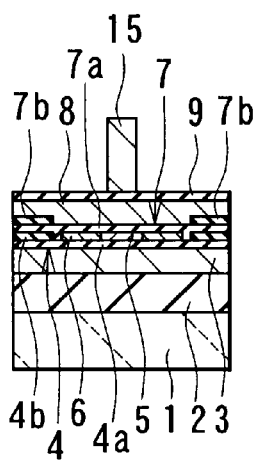
FIG. 14A     FIG. 14B

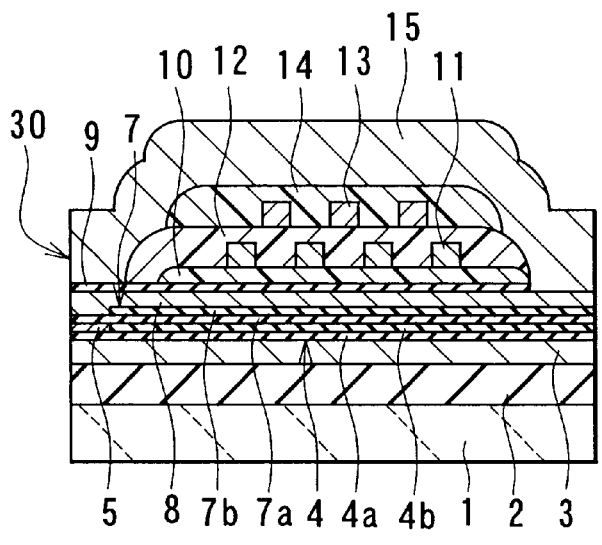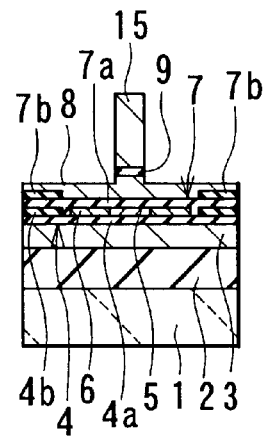
FIG. 15A  FIG. 15B
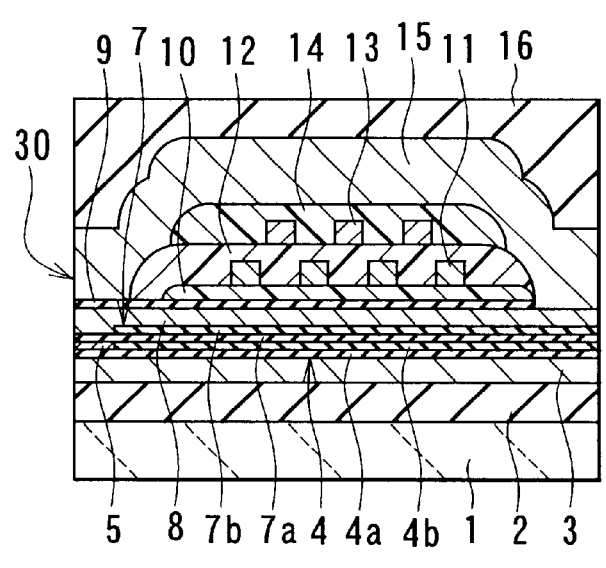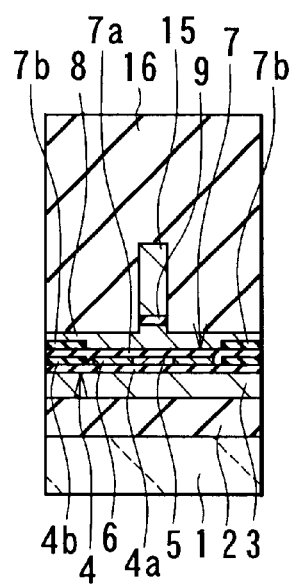
FIG. 16A  FIG. 16B

MAGNETORESISTIVE DEVICE AND METHOD OF MANUFACTURING SAME AND THIN-FILM MAGNETIC HEAD AND METHOD OF MANUFACTURING SAME

BACKGROUND OF THE INVENTION

1. Field of the Invention

The present invention relates to a magnetoresistive device that incorporates a magnetoresistive element and a method of manufacturing such a magnetoresistive device, and to a thin-film magnetic head that incorporates a magnetoresistive element and a method of manufacturing such a thin-film magnetic head.

2. Description of the Related Art

In recent years, performance improvements in thin-film magnetic heads have been sought as areal recording density of hard disk drives has increased. Such thin-film magnetic heads include composite thin-film magnetic heads that have been widely used. A composite thin-film magnetic head is made of a layered structure including a write (recording) head having an induction-type electromagnetic transducer for writing and a read (reproducing) head having a magnetoresistive element (that may be hereinafter called an MR element) for reading.

MR elements include: an AMR element that utilizes the anisotropic magnetoresistive effect; a GMR element that utilizes the giant magnetoresistive effect; and a TMR element that utilizes the tunnel magnetoresistive effect.

The read head comprises: an MR element; two electrode layers that are connected to the MR element in order to feed a current used for detecting a signal magnetic field (that may be hereinafter called a sense current) to the MR element; and two shield layers, i.e., top and bottom shield layers disposed to sandwich the MR element and the electrode layers to thereby shield them.

Insulating layers are interposed between the MR element/electrode layers and the top and bottom shield layers, respectively, to electrically isolate the MR element/the electrode layers from the shield layers. For example, these insulating layers are each made of a thin alumina film formed through sputtering.

When a GMR element is used as the MR element, for usual read operations, a voltage of about 200 mV is required to be applied from the electrode layers to the GMR element in order to feed a sense current to the GMR element. Conventional insulating layers have an insulating property sufficient to withstand a voltage of this magnitude.

However, the conventional insulating layers cannot withstand an electric field of several volts to tens of volts established by static electric charges that are built up in the process from integration to machine processing of the read head, which can result in electrostatic damage to the insulating layers. This problem becomes more serious when the insulating layers are required to be 10 to 20 nm in thickness or even thinner than this range from the viewpoint of recording density.

Conventionally, a variety of methods have been suggested for preventing damage to the MR element related to electrostatic discharge. Now, four of the methods are described below.

According to a first method, the top and bottom shield layers are electrically connected to each other as disclosed in Published Unexamined Japanese Patent Application (KOKAI) Nos. Sho 61-77114 and Hei 7-65324.

According to a second method, the shield layers are electrically connected to the electrode layers as disclosed in Published Unexamined Japanese Patent Application (KOKAI) No. Hei 10-11717.

According to a third method, two electrode layers are short-circuited between their terminals when processing the head and then the short-circuited portion between the terminals are cut off after the head has been processed, as disclosed in Published Unexamined Japanese Patent Application (KOKAI) Nos. Hei 8-315321, Hei 11-316915, Hei 11-45423, and Hei 6-60338.

A fourth method uses diodes, as disclosed in Published Unexamined Japanese Patent Application (KOKAI) Nos. Hei 7-85422, Hei 10-269534, Hei 10-255235, and 2000-76626. Published Unexamined Japanese Patent Application (KOKAI) No. Hei 7-85422 discloses a technique of connecting two diodes that are opposite in polarity in parallel between the terminals of two electrode layers. Published Unexamined Japanese Patent Application (KOKAI) No. Hei 10-269534 discloses a technique of connecting two diodes that are opposite in polarity in parallel between two electrode layers. Published Unexamined Japanese Patent Application (KOKAI) No. Hei 10-255235 discloses a technique of connecting two diodes that are opposite in polarity in parallel between two electrode layers, and also a technique of connecting two diodes that are opposite in polarity in parallel between an electrode layer and a shield layer. Published Unexamined Japanese Patent Application (KOKAI) No. 2000-76626 discloses techniques of connecting two diodes that are opposite in polarity in parallel between two electrode layers, connecting two diodes that are opposite in polarity in series between two shield layers, and connecting two diodes that are opposite in polarity in series between an electrode layer and a shield layer.

Any of these methods, however, present the following problems with regard to prevention of electrostatic damage to the insulating layers disposed between the electrode layers and the shield layers.

In the first method, when a large potential difference occurs between the shield layers and the electrode layers, it is impossible to prevent the electrostatic damage to the insulating layers disposed between the shield layers and the electrode layers.

In the second method, since the MR element and the shield layers are electrically connected via the electrode layers, the shielding function of the shield layers would be degraded.

In the third method, when a large potential difference occurs between the shield layers and the electrode layers, it is impossible to prevent the electrostatic damage to the insulating layers disposed between the shield layers and the electrode layers. Furthermore, in the third method, since the short-circuited portion between the terminals is cut off after the head has been processed, it is impossible to prevent electrostatic damage in post-processing steps, for example, in the step of fixing the head to a suspension after the head has been processed.

In the fourth method, it is necessary to form at least a total of four layers of n-type and p-type semiconductors, which makes the structure and manufacturing steps of the head complicated.

SUMMARY OF THE INVENTION

It is therefore an object of the invention to provide a magnetoresistive device and a method of manufacturing the same, and a thin-film magnetic head and a method of manufacturing the same, which make it possible to prevent electrostatic damage to the insulating layers disposed between the shield layer and the electrode layer connected to the magnetoresistive element, with a simple structure and simple manufacturing steps.

A magnetoresistive device of the invention comprises:

a magnetoresistive element that detects a magnetic field;

an electrode layer for feeding a current for detecting the magnetic field to the magnetoresistive element;

a first shield layer and a second shield layer that sandwich and shield the magnetoresistive element and the electrode layer;

a first insulating layer disposed between the magnetoresistive element/the electrode layer and the first shield layer;

a second insulating layer disposed between the magnetoresistive element/the electrode layer and the second shield layer; and a semiconductor layer that is made up of a single layer and disposed between the electrode layer and at least one of the shield layers, for connecting the electrode layer and the at least one of the shield layers.

According to the magnetoresistive device of the invention, the electrode layer and at least one of the shield layers are connected via the semiconductor layer. The semiconductor layer functions as an insulator for a voltage of such a level as is needed for feeding a current for detecting a magnetic field to the magnetoresistive element, whereas functioning as a conductor for a voltage of such a level as causes a dielectric breakdown of the insulating layer disposed between the electrode layer and the shield layer.

A method of the invention is provided for manufacturing a magnetoresistive device comprising: a magnetoresistive element that detects a magnetic field; an electrode layer for feeding a current for detecting the magnetic field to the magnetoresistive element; a first shield layer and a second shield layer that sandwich and shield the magnetoresistive element and the electrode layer; a first insulating layer disposed between the magnetoresistive element/the electrode layer and the first shield layer; and a second insulating layer disposed between the magnetoresistive element/the electrode layer and the second shield layer. The method comprises the steps of:

forming the first shield layer;

forming the first insulating layer on the first shield layer;

forming the magnetoresistive element and the electrode layer on the first insulating layer;

forming the second insulating layer on the magnetoresistive element and the electrode layer;

forming the second shield layer on the second insulating layer; and forming a semiconductor layer that is made up of a single layer and disposed between the electrode layer and at least one of the shield layers, for connecting the electrode layer and the at least one of the shield layers.

According to the method of manufacturing a magnetoresistive device of the invention, the electrode layer and at least one of the shield layers are connected via the semiconductor layer. The semiconductor layer functions as an insulator for a voltage of such a level as is needed for feeding a current for detecting a magnetic field to the magnetoresistive element, whereas functioning as a conductor for a voltage of such a level as causes a dielectric breakdown of the insulating layer disposed between the electrode layer and the shield layer.

A thin-film magnetic head of the invention comprises:

a medium facing surface that faces toward a recording medium;

a magnetoresistive element that detects a magnetic field from the recording medium;

an electrode layer for feeding a current for detecting the magnetic field to the magnetoresistive element;

a first shield layer and a second shield layer that sandwich and shield the magnetoresistive element and the electrode layer;

a first insulating layer disposed between the magnetoresistive element/the electrode layer and the first shield layer;

a second insulating layer disposed between the magnetoresistive element/the electrode layer and the second shield layer; and a semiconductor layer that is made up of a single layer and disposed between the electrode layer and at least one of the shield layers, for connecting the electrode layer and the at least one of the shield layers.

According to the thin-film magnetic head of the invention, the electrode layer and at least one of the shield layers are connected via the semiconductor layer. The semiconductor layer functions as an insulator for a voltage of such a level as is needed for feeding a current for detecting a magnetic field to the magnetoresistive element, whereas functioning as a conductor for a voltage of such a level as causes a dielectric breakdown of the insulating layer disposed between the electrode layer and the shield layer.

In the thin-film magnetic head of the invention, the semiconductor layer may be disposed between the vicinity of an end of the electrode layer, the end being located farther from the medium facing surface, and at least one of the shield layers.

A method of the invention is provided for manufacturing a thin-film magnetic head comprising: a medium facing surface that faces toward a recording medium; a magnetoresistive element that detects a magnetic field from the recording medium; an electrode layer for feeding a current for detecting the magnetic field to the magnetoresistive element; a first shield layer and a second shield layer that sandwich and shield the magnetoresistive element and the electrode layer; a first insulating layer disposed between the magnetoresistive element/the electrode layer and the first shield layer; and a second insulating layer disposed between the magnetoresistive element/the electrode layer and the second shield layer. The method comprising the steps of:

forming the first shield layer;

forming the first insulating layer on the first shield layer;

forming the magnetoresistive element and the electrode layer on the first insulating layer;

forming the second insulating layer on the magnetoresistive element and the electrode layer;

forming the second shield layer on the second insulating layer; and forming a semiconductor layer that is made up of a single layer and disposed between the electrode layer and at least one of the shield layers, for connecting the electrode layer and the at least one of the shield layers.

According to the method of manufacturing a thin-film magnetic head of the invention, the electrode layer and at least one of the shield layers are connected via the semiconductor layer. The semiconductor layer functions as an insulator for a voltage of such a level as is needed for feeding a current for detecting a magnetic field to the magnetoresistive element, whereas functioning as a conductor for a voltage of such a level as causes a dielectric breakdown of the insulating layer disposed between the electrode layer and the shield layer.

In the method of manufacturing a thin-film magnetic head of the invention, the semiconductor layer may be disposed between the vicinity of an end of the electrode layer, the end being located farther from the medium facing surface, and at least one of the shield layers.

Other and further objects, features and advantages of the invention will appear more fully from the following description.

BRIEF DESCRIPTION OF THE DRAWINGS

FIG. 3 is a cross section taken along line 3—3 of FIG. 1.

FIG. 4A and FIG. 4B are cross sections for illustrating a step of a method of manufacturing the read head of the thin-film magnetic head according to the embodiment of the invention.

FIG. 5A and FIG. 5B are cross sections for illustrating a step that follows FIG. 4A and FIG. 4B.

FIG. 6A and FIG. 6B are cross sections for illustrating a step that follows FIG. 5A and FIG. 5B.

FIG. 13A and FIG. 13B are cross sections for illustrating a step of a method of manufacturing the thin-film magnetic head according to the embodiment of the invention.

FIG. 14A and FIG. 14B are cross sections for illustrating a step that follows FIG. 13A and FIG. 13B.

FIG. 15A and FIG. 15B are cross sections for illustrating a step that follows FIG. 14A and FIG. 14B.

FIG. 16A and FIG. 16B are cross sections for illustrating a step that follows FIG. 15A and FIG. 15B.

DETAILED DESCRIPTION OF THE PREFERRED EMBODIMENT

Figure 1:
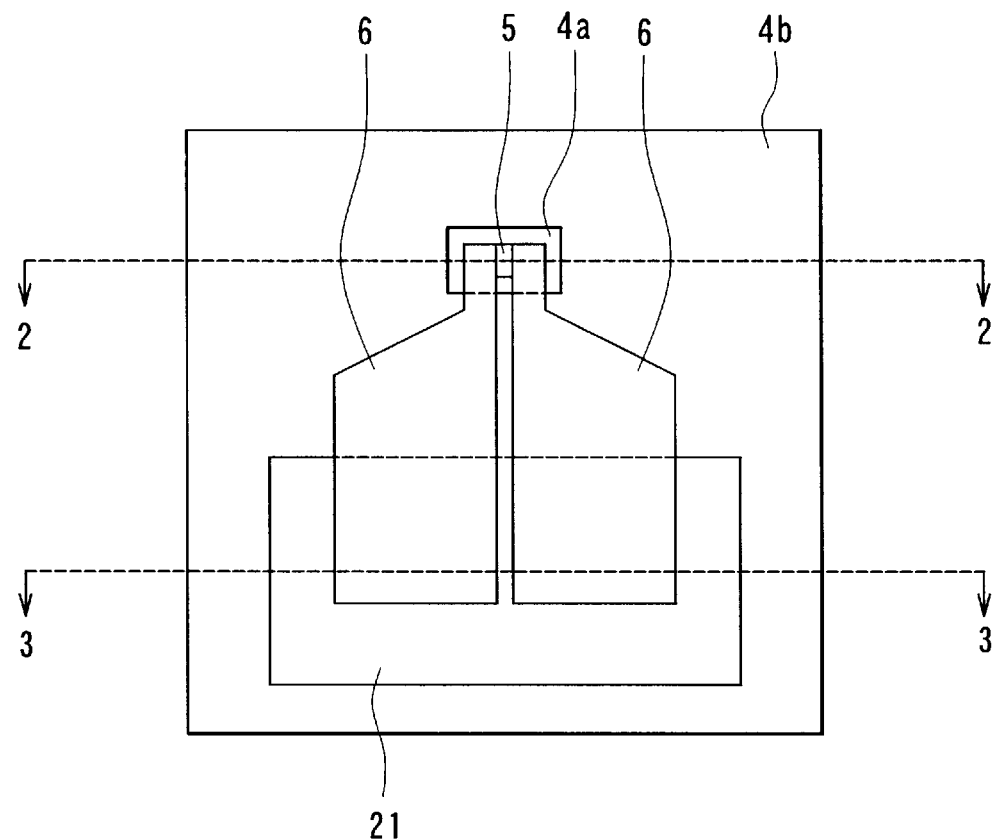
FIG. 1 is a plan view illustrating the main part of a read head of a thin-film magnetic head according to an embodiment of the invention.

A preferred embodiment of the invention will now be described in detail with reference to the accompanying drawings. Reference is now made to FIG. 13A to FIG. 16A and FIG. 13B to FIG. 16B to describe a thin-film magnetic head according to an embodiment of the invention and an outline of a method of manufacturing the same. FIG. 13A to FIG. 16A are cross sections each orthogonal to the air bearing surface, while FIG. 13B to FIG. 16B are cross sections of the magnetic pole portion each parallel to the air bearing surface.

In the method of manufacturing the thin-film magnetic head, as shown in FIG. 13A and FIG. 13B, an insulating layer 2 made of an insulating material such as alumina ($Al_2O_3$) or silicon dioxide ($SiO_2$), for example, is first formed to a thickness of 1 to 20 $\mu$m through sputtering or the like on a substrate 1 made of a ceramic material such as aluminum oxide and titanium carbide ($Al_2O_3$—TiC). On the insulating layer 2, a bottom shield layer 3 is formed to a thickness of 0.1 to 5 $\mu$m, for example, for making a read head. The bottom shield layer 3 is made of a magnetic material such as FeAlSi, NiFe, CoFe, CoFeNi, FeN, FeZrN, FeTaN, CoZrNb, or CoZrTa. The bottom shield layer 3 is formed through sputtering or plating.

Then, on the bottom shield layer 3, a first insulating film 4a of a bottom insulating layer 4, made of an insulating material such as $Al_2O_3$ or $SiO_2$, is formed to a thickness of 10 to 200 nm, for example, through sputtering or the like. The bottom insulating layer 4 is made up of the first insulating film 4a and a second insulating film 4b to be described later. On the first insulating film 4a, an MR element (magnetoresistive element) 5 used for reading is formed to a thickness of tens of nanometers, for example, through sputtering or the like. The MR element 5 may be an element made of a magnetosensitive film that exhibits a magnetoresistive effect, such as an AMR element, a GMR element, or a TMR element. Then, on the first insulating film 4a, a pair of electrode layers 6 are formed to a thickness of tens of nanometers, for example, through sputtering or the like. The electrode layers 6 are electrically connected to the MR element 5 and feed a current for detecting a magnetic field, i.e., a sense current, to the MR element 5. Then, on the first insulating film 4a excluding a periphery of the MR element 5, the second insulating film 4b of the bottom insulating layer 4, made of an insulating material such as $Al_2O_3$ or $SiO_2$, is formed through sputtering or the like, to a thickness twice that of the first insulating film 4a or greater, for example. Then, on the bottom insulating layer 4 and the MR element 5, a first insulating film 7a of a top insulating layer 7, made of an insulating material such as $Al_2O_3$ or $SiO_2$, is formed to a thickness of 10 to 200 nm, for example, through sputtering or the like. The top insulating layer 7 is made up of the first insulating film 7a and a second insulating film 7b to be described later. Then, on the first insulating film 7a excluding the periphery of the MR element 5, the second insulating film 7b of the top insulating layer 7, made of an insulating material such as $Al_2O_3$ or $SiO_2$, is formed through sputtering or the like, to a thickness twice that of the first insulating film 7a or greater, for example.

On the top insulating layer 7, formed is a top-shield-layer-cum-bottom-pole layer (hereinafter referred to as a top shield layer) 8, which is made of a magnetic material and used for both the read head and write head, is formed to a thickness of 0.5 to 4.0 $\mu$m, for example. The top shield layer 8 is made of a soft magnetic material such as NiFe, CoFe, CoFeNi, or FeN. The top shield layer 8 is formed through sputtering, plating, or the like.

The aforementioned layers that constitute the read head are patterned through an ordinary etching method using a patterned resist and/or a lift-off method.

In this embodiment, also provided are a bottom semiconductor layer that is made up of a single layer and connects the electrode layers 6 and the bottom shield layer 3, and a top semiconductor layer that is made up of a single layer and connects the electrode layers 6 and the top shield layer 8. The bottom and top semiconductor layers will be described in more detail later.

On the top shield layer 8, a write gap layer 9 made of an insulating material such as $Al_2O_3$ or $SiO_2$ is formed to a thickness of 10 to 500 nm, for example, through sputtering or the like. Then, a portion of the write gap layer 9 located in a center portion of a thin-film coil described later is etched to form a contact hole 9a for making a magnetic path.

Next, an insulating layer 10 made of a thermoset photoresist, for example, is formed on the write gap layer 9 in a portion in which the thin-film coil is to be formed. Then, a first layer 11 of the thin-film coil made of a conductive material such as Cu is formed by frame plating, for example, on the insulating layer 10. An insulating layer 12 made of a thermoset photoresist, for example, is then formed to cover the insulating layer 10 and the first layer 11 of the thin-film coil. Next, a second layer 13 of the thin-film coil made of a conductive material such as Cu is formed by frame plating, for example, on the insulating layer 12. An insulating layer 14 made of a thermoset photoresist, for example, is then formed to cover the insulating layer 12 and the second layer 13 of the thin-film coil. The first layer 11 and the second layer 13 of the coil are connected to each other and wound around the contact hole 9a. For example, the total thickness of the first layer 11 and the second layer 13 is 2 to 5 $\mu$m and the total thickness of the insulating layers 10, 12 and 14 is 3 to 20 $\mu$m.

Then, as shown in FIG. 14A and FIG. 14B, a top pole layer 15 made of a magnetic material is formed to a thickness of 3 to 5 $\mu$m, for example, for the write head. The top pole layer 15 extends from an air bearing surface (medium facing surface) 30 through the top of the insulating layers 12 and 14 to the contact hole 9a. The top pole layer 15 is made of a soft magnetic material such as NiFe, CoFe, CoFeNi or FeN.

The bottom pole layer (the top shield layer 8) and the top pole layer 15 include portions that are opposed to each other and located on a side of the air bearing surface 30, the write gap layer 9 being disposed between these portions. These portions are the magnetic pole portion of the bottom pole layer (the top shield layer 8) and the magnetic pole portion of the top pole layer 15. In this embodiment the magnetic pole portion of the top pole layer 15 has a width equal to the write track width and defines the write track width. The bottom pole layer (the top shield layer 8) and the top pole layer 15 are magnetically coupled to each other through the contact hole 9a.

As shown in FIG. 15A and FIG. 15B, the write gap layer 9 is selectively etched through dry etching, using the magnetic pole portion of the top pole layer 15 as a mask. This dry etching may be reactive ion etching (RIE) using a chlorine-base gas such as $BCl_2$ or $Cl_2$, or a fluorine-base gas such as $CF_4$ or $SF_6$, for example. Then, the top shield layer 8 is selectively etched by about 0.3 to 0.6 $\mu$m, for example, through argon ion milling, for example. A trim structure as shown in FIG. 15B is thus formed. The trim structure suppresses an increase in the effective track width due to expansion of a magnetic flux generated during writing in a narrow track.

Then, as shown in FIG. 16A and FIG. 16B, a protection layer 16 made of an insulating material such as $Al_2O_3$ or $SiO_2$ is formed over the entire surface to a thickness of 5 to 50 $\mu$m, for example, through sputtering. The surface of the protection layer 16 is flattened and pads (not shown) for electrodes are formed thereon. Finally, lapping of the slider including the foregoing layers is performed to form the air bearing surface 30 of the thin-film magnetic head including the write head and the read head. The thin-film magnetic head of the embodiment is thus completed.

The thin-film magnetic head of the embodiment manufactured through the foregoing steps comprises the medium facing surface that faces toward a recording medium (the air bearing surface 30), the read head and the write head. The read head incorporates: the MR element 5; and the bottom shield layer 3 and the top shield layer 8 for shielding the MR element 5. Portions of the bottom shield layer 3 and the top shield layer 8 that are located on a side of the air bearing surface 30 are opposed to each other, the MR element 5 being disposed between these portions. The read head corresponds to the magnetoresistive device of this embodiment, too.

The write head incorporates the bottom pole layer (the top shield layer 8) and the top pole layer 15 that are magnetically coupled to each other, each of which includes at least one layer. The bottom pole layer and the top pole layer 15 include the magnetic pole portions that are opposed to each other and placed in regions on a side of the air bearing surface 30. The write head further incorporates: the write gap layer 9 provided between the magnetic pole portion of the bottom pole layer (the top shield layer 8) and the magnetic pole portion of the top pole layer 15; and the thin-film coil made up of the layers 11 and 13, at least a part of the coil being disposed between the bottom pole layer (the top shield layer 8) and the top pole layer 15 and insulated from the bottom and top pole layers. The magnetic pole portion of the top pole layer 15 defines the write track width.

Figure 2:
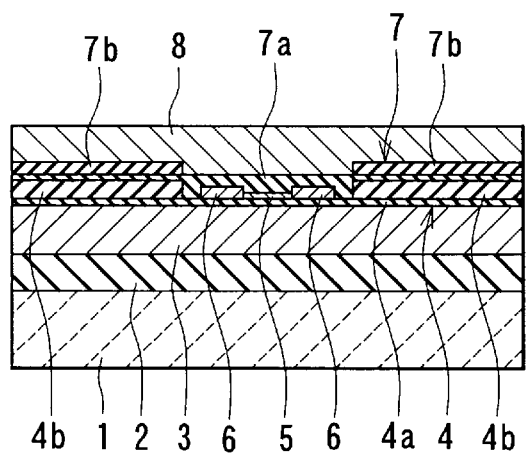
FIG. 2 is a cross section taken along line 2—2 of FIG. 1.

Reference is now made to FIG. 1 to FIG. 3 to describe the configuration of the read head in the embodiment, that is, the magnetoresistive device of the embodiment in detail. FIG. 1 is a plan view illustrating the main part of the read head incorporated in the thin-film magnetic head of the embodiment. FIG. 2 is a cross section taken along line 2—2 of FIG. 1, while FIG. 3 is a cross section taken along line 3—3 of FIG. 1. In the read head shown in FIG. 1, the air bearing surface 30 has not yet been formed. The top insulating layer 7 and the top shield layer 8 are omitted in FIG. 1. Through lapping the slider, the part defined by line 2—2 of FIG. 1 is made into the air bearing surface 30.

The read head comprises: the MR element 5 that detects a magnetic field; a pair of electrode layers 6 for feeding a sense current to the MR element 5; the bottom shield layer 3 and the top shield layer 8 that sandwich and shield the MR element 5 and the electrode layers 6; the bottom insulating layer 4 disposed between the MR element 5/the electrode layers 6 and the bottom shield layer 3; the top insulating layer 7 disposed between the MR element 5/the electrode layers 6 and the top shield layer 8; a bottom semiconductor layer 21 that is made up of a single layer and disposed between the electrode layers 6 and the bottom shield layer 3, for connecting the electrode layers 6 and the bottom layer 3; and a top semiconductor layer 22 that is made up of a single layer and disposed between the electrode layers 6 and the top shield layer 8, for connecting the electrode layers 6 and the top shield layer 8.

The bottom insulating layer 4 includes the first insulating film 4a and the second insulating film 4b. The first insulating film 4a is formed on the bottom shield layer 3. The MR element 5 and the electrode layers 6 are formed on the first insulating film 4a. The second insulating film 4b is formed on the first insulating film 4a excluding the periphery of the MR element 5.

The top insulating layer 7 includes the first insulating film 7a and the second insulating film 7b. The first insulating film 7a is formed to cover the bottom insulating layer 4, the MR element 5 and the electrode layers 6. The second insulating film 7b is formed on the first insulating film 7a excluding the periphery of the MR element 5.

The bottom semiconductor layer 21 is disposed between the vicinity of an end of each of the electrode layers 6, the end being located farther from the air bearing surface 30 (the end is hereinafter called a rear end), and the bottom shield layer 3. The bottom semiconductor layer 21 is also disposed so as to replace a part of the bottom insulating layer 4.

The top semiconductor layer 22 is disposed between the vicinity of the rear end of each of the electrode layers 6 and the top shield layer 8. The top semiconductor layer 22 is also disposed so as to replace a part of the top insulating layer 7.

Each of the semiconductor layers 21 and 22 may be made of a IV-group semiconductor such as amorphous Si or amorphous Ge; a compound semiconductor such as SiC or SiN; or a III–V-group semiconductor such as GaAs or GaP. The aforementioned materials may be doped with boron (B), phosphor (P) or the like to control the semiconductor property. It is also possible to use an oxide semiconductor which is based on an oxide typified by $TiO_2$ or ZnO.

Each of the semiconductor layers 21 and 22 is preferably formed through a method that enables its deposition at a relatively low temperature (at room temperature to 200° C. on the substrate), such as by evaporation, DC (direct current) sputtering, RF (radio frequency) sputtering, ECR (electron cyclotron resonance) sputtering, plasma-assisted CVD (chemical vapor deposition), or optical CVD. This is because of the need for preventing the MR element 5 from being damaged due to heat.

The thicknesses of the semiconductor layers 21 and 22 may be chosen from a range of about 10 nm to about 1 μm. This is because the semiconductor layers 21 and 22 are disposed near the rear ends of the electrode layers 6 and therefore the thicknesses of the semiconductor layers 21 and 22 are not to be restricted by the spacing (or the gap length) between the shield layers 3 and 8 in the air bearing surface 30.

It is possible to provide only one of the semiconductor layers 21 and 22. In this case, it is preferable to provide the semiconductor layer 22 that connects the electrode layers 6 and the top shield layer 8. The reason is that the top insulating layer 7 is more likely to suffer an electrostatic damage as compared with the bottom insulating layer 4 in the steps after the top shield layer 8 has been formed. Providing only one of the semiconductor layers 21 and 22 simplifies the steps of manufacture of the thin-film magnetic head.

Reference is now made to FIG. 4A to FIG. 12A and FIG. 4B to FIG. 12B to describe in detail a method of manufacturing the read head of the thin-film magnetic head according to the embodiment of the invention. FIG. 13A to FIG. 16A are cross sections taken along line 2—2 of FIG. 1, while FIG. 13B to FIG. 16B are cross sections taken along line 3—3 of FIG. 1.

In the method of manufacturing the read head, as shown in FIG. 4A and FIG. 4B, the bottom shield layer 3 is first formed into a predetermined shape on the insulating layer 2 through sputtering, plating, or the like. Then, the first insulating film 4a of the bottom insulating layer 4 is formed on the bottom shield layer 3 through sputtering.

Then, on the first insulating film 4a, a film to be the MR element 5 (e.g., a magnetic multi-layer film to be a GMR element) through sputtering. Then, a patterned resist (not shown) corresponding to the shape of the MR element 5 is formed on the aforementioned film in the region where the MR element 5 is to be formed. Using this patterned resist as a mask, the aforementioned film is etched to form the MR element 5 having a predetermined shape. The patterned resist is then removed.

Then, a patterned resist (not shown) is formed on the MR element 5 and on the first insulating film 4a around the MR element 5. This patterned resist is then used as a mask to form the second insulating film 4b of the bottom insulating layer 4 through sputtering. The patterned resist is then removed.

Then, as shown in FIG. 5A and FIG. 5B, a resist layer 31 is formed on the first insulating film 4a, the second insulating film 4b, and the MR element 5, excluding the region in which the bottom semiconductor layer 21 is to be formed later, or the region in the vicinity of the rear ends of the electrode layers 6 to be formed later. Then, the portions of the first insulating film 4a and the second insulating film 4b that are not covered with the resist layer 31 are removed by physical or chemical etching to expose the bottom shield layer 3.

Figure 7A:
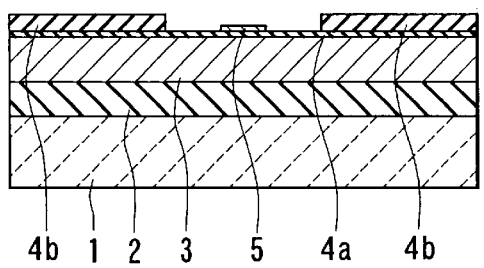
FIG. 7A and FIG. 7B are cross sections for illustrating a step that follows FIG. 6A and FIG. 6B.
Figure 7B:
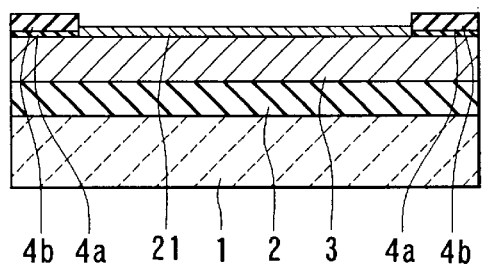

Then, as shown in FIG. 6A and FIG. 6B, the bottom semiconductor layer 21 is formed through sputtering, plasma CVD, or the like on the portion of the bottom shield layer 3 that is not covered with the resist layer 31. Then, as shown in FIG. 7A and FIG. 7B, the resist layer 31 is removed.

Figure 8A:
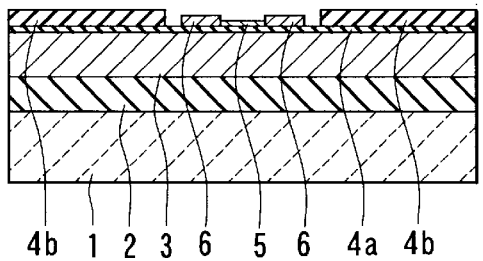
FIG. 8A and FIG. 8B are cross sections for illustrating a step that follows FIG. 7A and FIG. 7B.
Figure 8B:
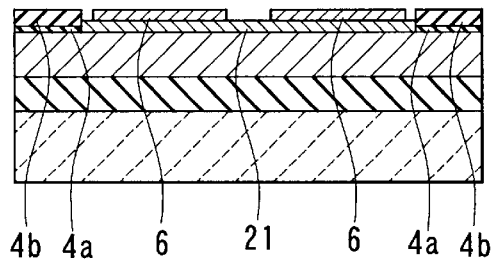

Then, as shown in FIG. 8A and FIG. 8B, a film to be the electrode layers 6 is formed on the first insulating film 4a. Then, patterned resists (not shown) corresponding to the shapes of the electrode layers 6 are formed on this film. Using the patterned resists as masks, the aforementioned film is etched to form the electrode layers 6 into predetermined shapes. The patterned resists are then removed.

Figure 9A:
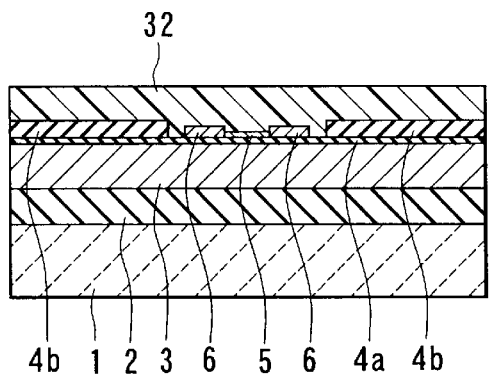
FIG. 9A and FIG. 9B are cross sections for illustrating a step that follows FIG. 8A and FIG. 8B.
Figure 9B:
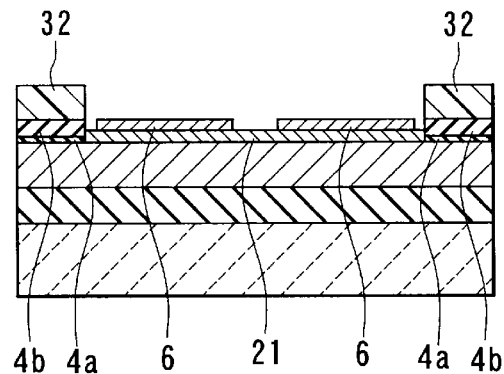

Then, as shown in FIG. 9A and FIG. 9B, a resist layer 32 is formed on the first insulating film 4a, the second insulating film 4b, the MR element 5, the electrode layers 6, and the bottom semiconductor layer 21, excluding the region in which the top semiconductor layer 22 is to be formed later, or the region in the vicinity of the rear ends of the electrode layers 6.

Figure 10A:
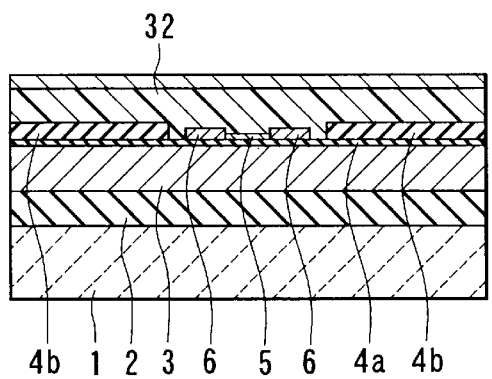
FIG. 10A and FIG. 10B are cross sections for illustrating a step that follows FIG. 9A and FIG. 9B.
Figure 10B:
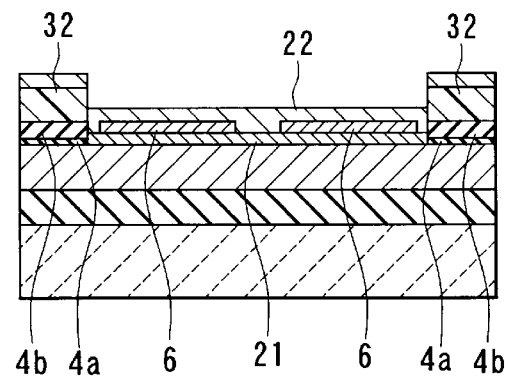
Figure 11A:
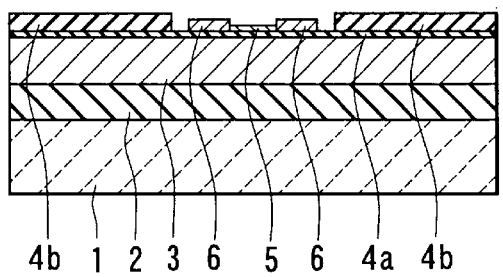
FIG. 11A and FIG. 11B are cross sections for illustrating a step that follows FIG. 10A and FIG. 10B.
Figure 11B:
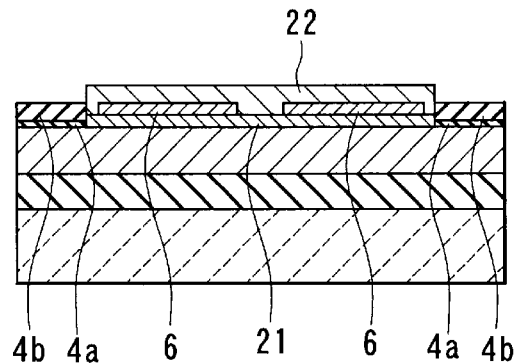

Then, as shown in FIG. 10A and FIG. 10B, the top semiconductor layer 22 is formed through sputtering, plasma CVD, or the like on the portions of the electrode layers 6 and the bottom semiconductor layer 21 that are not covered with the resist layer 32. Then, as shown in FIG. 11A and FIG. 11B, the resist layer 32 is removed.

Figure 12A:
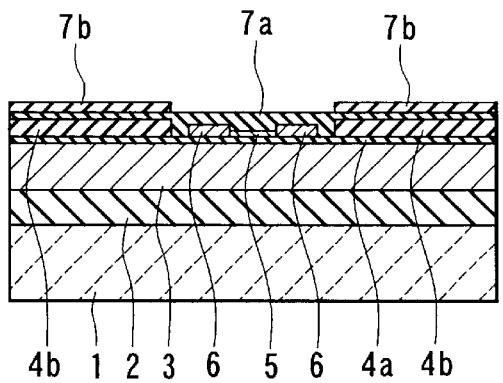
FIG. 12A and FIG. 12B are cross sections for illustrating a step that follows FIG. 11A and FIG. 11B.
Figure 12B:
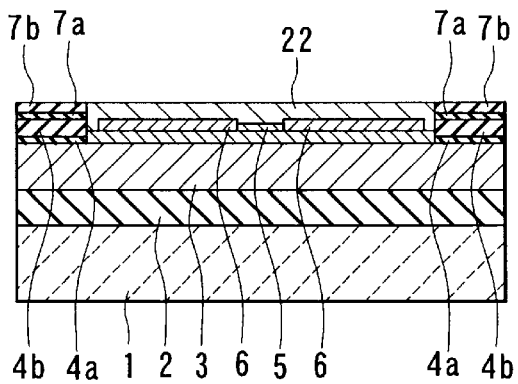

Then, a patterned resist (not shown) is formed on the top semiconductor layer 22 and, as shown in FIG. 12A and FIG. 12B, the first insulating film 7a of the top insulating layer 7 is formed through sputtering on the first insulating film 4a, the second insulating film 4b, the MR element 5 and the electrode layers 6, using the aforementioned patterned resist as a mask.

Then, another patterned resist (not shown) is formed on the MR element 5 and the first insulating film 7a around the MR element 5. Using the patterned resist on the top semiconductor layer 22 and the patterned resist on and around the MR element 5 as masks, the second insulating film 7b of the top insulating layer 7 is formed through sputtering. The two patterned resists are then removed.

Then, as shown in FIG. 2 and FIG. 3, the top shield layer 8 is formed into a predetermined shape through sputtering, plating, or the like on the first insulating film 7a, the second insulating film 7b, and the top semiconductor layer 22. The read head is thus completed.

As described above, in the magnetoresistive device and the method of manufacturing same, and the thin-film magnetic head and the method of manufacturing same according to the embodiment, the electrode layers 6 and the bottom shield layer 3 are connected via the bottom semiconductor layer 21 made up of a single layer, while the electrode layers 6 and the top shield layer 8 are connected via the top semiconductor layer 22 made up of a single layer. The semiconductor layers 21 and 22 each function as an insulator for a voltage of such a level as is needed for feeding a sense current to the MR element 5, whereas functioning as a conductor for a voltage of such a level as causes a dielectric breakdown of the insulating layers 4 and 7 disposed between the electrode layers 6 and the shield layers 3 and 8, respectively. The embodiment therefore makes it possible to prevent an electrostatic damage to the insulating layers 4 and 7 disposed between the electrode layers 6 connected to the MR element 5 and the shield layers 3 and 8, respectively, with a simple structure and simple manufacturing steps.

Furthermore, the embodiment allows a wide choice of the thicknesses of the semiconductor layers 21 and 22, because the semiconductor layers 21 and 22 are disposed in the vicinity of the rear ends of the electrode layers 6.

Now, explained below are the results obtained through measurements of insulation property of the insulating films in three examples of the embodiment of the invention and in a comparative example.

First, description is given as to the comparative example. The comparative example provides a read head that has no semiconductor layers 21, 22. In this comparative example, a 10-nm-thick alumina ($Al_2O_3$) film formed through sputtering was used as each of the first insulating film 4a of the bottom insulating layer 4 and the first insulating film 7a of the top insulating layer 7. The sputtering was performed using a target of polycrystalline $Al_2O_3$, an electromagnetic wave of 13.56 MHz, and excited plasma in a reaction gas of Ar and $O_2$. Before deposition of the films, the surfaces of the bases thereof were cleaned through inverse sputtering for five minutes.

Figure 17:
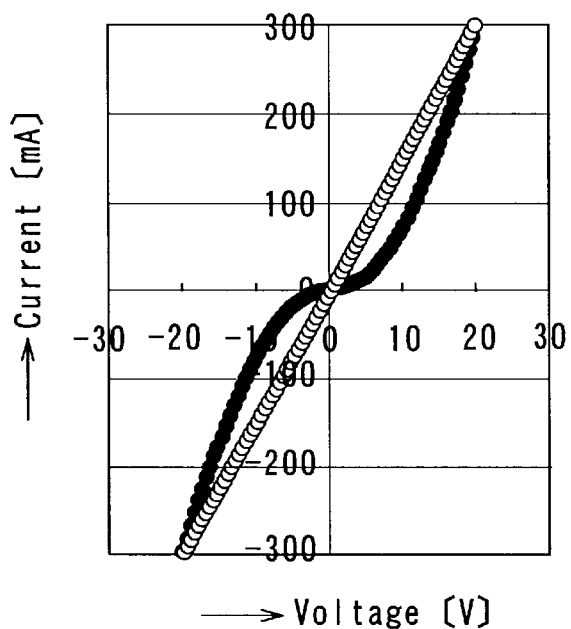
FIG. 17 is a characteristic diagram illustrating the voltage versus current characteristics of an insulating film of a comparative example.

FIG. 17 is a characteristic diagram illustrating the voltage versus current characteristics of the insulating film of the comparative example. Voltages ranging from 0 V to +/−20V were applied in increments or decrements of 0.5V across the first insulating film 7a disposed between the top shield layer 8 and the electrode layers 6, and then the currents flowing through the first insulating film 7a were measured, thereby obtaining the voltage versus current characteristics shown in FIG. 17. In FIG. 17, the black dots indicate the first measurements, while the white dots indicate the second measurements for the same first insulating film 7a.

In the comparative example, the first measurements revealed that the value of the current was 0 mA when the applied voltage was in the range of about −0.5V to about 0.5V. This indicates that the first insulating film 7a functioned as an insulating film for a voltage of such a level as is needed for feeding a sense current to the MR element 5. However, the second measurements showed that the current was generally proportional to the applied voltage, indicating that the electrode layers 6 and the top shield layer 8 were in substantially ohmic contact with each other. In other words, the first insulating film 7a had suffered a dielectric breakdown through the first measurements and therefore did not function as an insulator in the second measurements. On the other hand, in the comparative example, 2.64% of the first insulating films 7a did not suffer a dielectric breakdown with an applied voltage ranging from −2V to 2V.

Next, description is given as to a first example of the embodiment of the invention. In the first example, a 10-nm-thick alumina ($Al_2O_3$) film formed through sputtering was used as each of the first insulating film 4a of the bottom insulating layer 4 and the first insulating film 7a of the top insulating layer 7. The sputtering was performed using a target of polycrystalline $Al_2O_3$, an electromagnetic wave of 13.56 MHz, and excited plasma in a reaction gas of Ar and $O_2$. Before deposition of the films, the surfaces of the bases thereof were cleaned through inverse sputtering for five minutes.

In the first example, a 1-$\mu$m-thick amorphous Si layer formed through sputtering was used as each of the semiconductor layers 21 and 22. The sputtering was performed using a target of monocrystalline Si, an electromagnetic wave of 13.56 MHz, and excited plasma in a reaction gas of Ar. Before deposition of the layers, the surfaces of the bases thereof were cleaned through inverse sputtering for five minutes.

Figure 18:
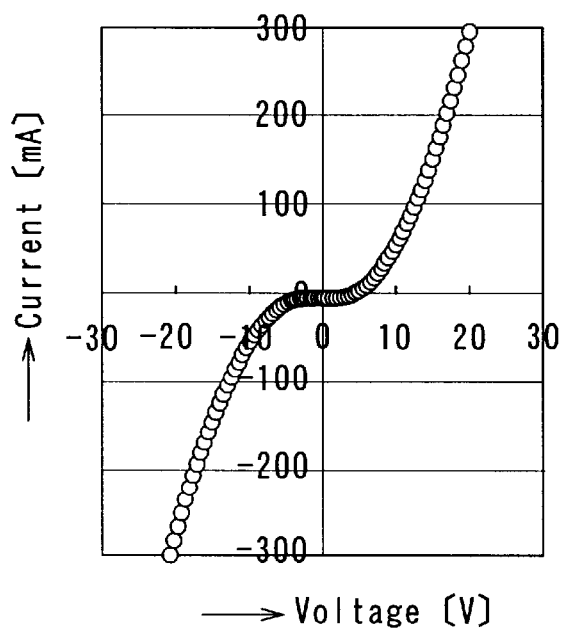
FIG. 18 is a characteristic diagram illustrating the voltage versus current characteristics of an insulating film of a first example of the embodiment of the invention.

FIG. 18 is a characteristic diagram illustrating the voltage versus current characteristics of the insulating film of the first example. The measurements for determining the characteristics were carried out in the same way as in the comparative example. In the first example, the measurements revealed that the value of the current was 0 mA when the applied voltage was in the range of about −1V to about 1V, indicating that the first insulating film 7a functioned as an insulating film for a voltage of such a level as is needed for feeding a sense current to the MR element 5. Similar results were obtained for the second measurements. In the first example, 98.7% of the first insulating films 7a did not suffer a dielectric breakdown with an applied voltage ranging from −2V to 2V.

Next, description is given as to a second example of the embodiment of the invention. In the second example, a 10-nm-thick alumina ($Al_2O_3$) film formed through sputtering was used as each of the first insulating film 4a of the bottom insulating layer 4 and the first insulating film 7a of the top insulating layer 7. The films were deposited in the same manner as that in the first example.

In the second example, a 1-$\mu$m-thick, B-doped amorphous Si film formed through plasma CVD was used as each of the semiconductor layers 21 and 22. The films were deposited in the following manner. First, a sample was placed in a reaction chamber, and the chamber was then evacuated to a pressure of $5 \times 10^{-5}$ Pa or less. Then, an Ar gas was introduced into the reaction chamber at a flow of 15 sccm (standard cc/min). Then, an electromagnetic wave of 13.56 MHz was applied to the substrate such that the substrate was self-biased, thereby cleaning the surface of the substrate for five minutes. The Ar gas was then discharged to reduce the pressure to $5 \times 10^{-5}$ Pa or less, followed by introduction of $SiH_4$ and $B_2H_6$ at a flow of 24 sccm and 6.3 sccm, respectively, into the reactive chamber. Then, plasma was excited with an electromagnetic wave of 13.56 MHz such that the substrate was not self-biased. Through the aforementioned steps, the B-doped amorphous Si film was deposited. From the measurements using ESCA (Electron Spectroscopy for Chemical Analysis: photoelectron spectroscopic analysis using an X-ray as a light source for excitation) and RBS (Rutherford Backscattering Method) on the resulting film, the doping amount of B was estimated to be less than one atomic percent.

Figure 19:
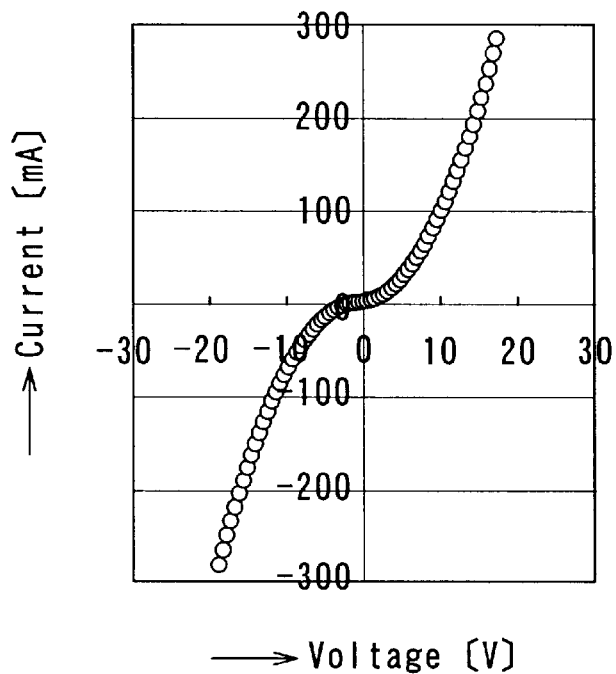
FIG. 19 is a characteristic diagram illustrating the voltage versus current characteristics of an insulating film of a second example of the embodiment of the invention.

FIG. 19 is a characteristic diagram illustrating the voltage versus current characteristics of the insulating film of the second example. The measurements for determining the characteristics were carried out in the same way as in the comparative example. In the second example, the measurements showed that the current was 0 mA when the applied voltage was in the range of about −0.5V to about 0.5V, indicating that the first insulating film 7a functioned as an insulating film for a voltage of such a level as is needed for feeding a sense current to the MR element 5. Similar results were obtained for the second measurements. In the second example, the current rose more sharply than in the first example. This would be because of an energy level created in the film by the doping with B. A thin-film magnetic head according to the second example was used for actual read and write operations. As a result, noise was found to be higher as compared with the case of a thin-film magnetic head according to the first example. In the second example, 92.7% of the first insulating films 7a did not suffer a dielectric breakdown with an applied voltage ranging from −2V to 2V.

Next, description is given as to a third example of the embodiment of the invention. In the third example, a 10-nm-thick alumina ($Al_2O_3$) film formed through sputtering was used as each of the first insulating film 4a of the bottom insulating layer 4 and the first insulating film 7a of the top insulating layer 7. The films were deposited in the same manner as that in the first example.

In the third example, the bottom semiconductor layer 21 was not provided but the top semiconductor layer 22 was only provided. A 1-$\mu$m-thick amorphous Si layer formed through sputtering was used as the semiconductor layer 22. The sputtering was performed using a target of monocrystalline Si, an electromagnetic wave of 13.56 MHz, and excited plasma in a reaction gas of Ar. Before deposition of the layer, the surface of the base thereof was cleaned through inverse sputtering for five minutes.

Figure 20:
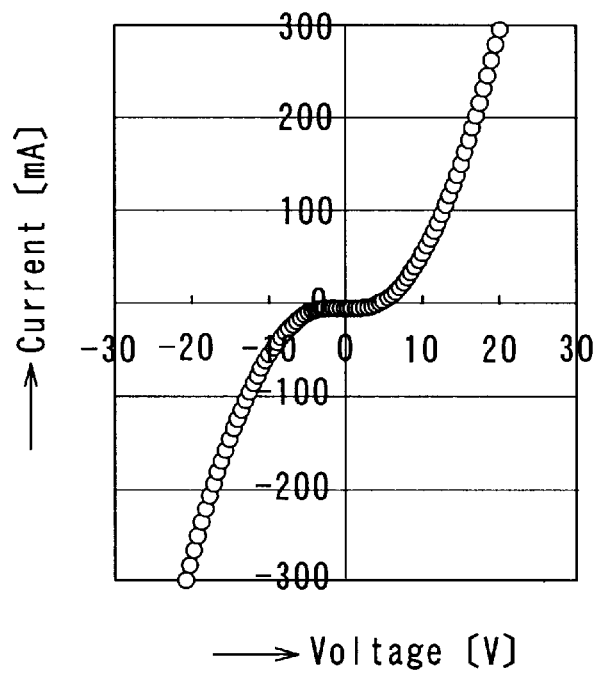
FIG. 20 is a characteristic diagram illustrating the voltage versus current characteristics of an insulating film of a third example of the embodiment of the invention.

FIG. 20 is a characteristic diagram illustrating the voltage versus current characteristics of the insulating film of the third example. The measurements for determining the characteristics were carried out in the same way as in the comparative example. In the third example, the measurements revealed that the value of the current was 0 mA when the applied voltage was in the range of about −1V to about 1V, indicating that the first insulating film 7a functioned as an insulating film for a voltage of such a level as is needed for feeding a sense current to the MR element 5. Similar results were obtained for the second measurements. In the third example, 97.5% of the first insulating films 7a did not suffer a dielectric breakdown with an applied voltage ranging from −2V to 2V.

From the aforementioned first to third examples, it is shown that the semiconductor layer 22 prevents dielectric breakdown of the first insulating film 7a. In this connection, it can be naturally considered that the semiconductor layer 21 can similarly prevent dielectric breakdown of the first insulating film 4a. Furthermore, the third example indicates that when one of the semiconductor layers 21 and 22 is provided, dielectric breakdown is prevented for one of the insulating films.

The present invention is not limited to the aforementioned embodiment but may be practiced in still other ways. For example, although in the embodiment the semiconductor layers 21 and 22 are disposed near the rear ends of the electrode layers 6, they may be disposed wherever between the electrode layers 6 and the bottom shield layers 3 and 8, respectively. However, it is not preferable that the semiconductor layers 21 and 22 are exposed in the air bearing surface 30. This is because the characteristics of the semiconductor layers 21 and 22 can possibly deteriorate due to oxidation or the like, if they are exposed in the air bearing surface 30.

The embodiment of the invention discloses the thin-film magnetic head having the magnetoresistive device for reading formed on the base body and the induction-type electromagnetic transducer for writing stacked on the magnetoresistive device. Alternatively, however, the magnetoresistive device may be stacked on the electromagnetic transducer.

If the thin-film magnetic head is to be used for reading only, the head may comprise the magnetoresistive device for reading only.

The magnetoresistive device according to the invention is not limited to the read head of the thin-film magnetic head but is also applicable to a rotational position sensor, a magnetic sensor, a current sensor, and so on.

According to the magnetoresistive device and the method of manufacturing the same, or the thin-film magnetic head and the method of manufacturing the same of the invention described so far, the electrode layer and at least one of the shield layers are connected via the semiconductor layer. The semiconductor layer functions as an insulator for a voltage of such a level as is needed for feeding a current for detecting a magnetic field to the magnetoresistive element, whereas functioning as a conductor for a voltage of such a level as causes a dielectric breakdown of the insulating layer disposed between the electrode layer and the shield layer. Therefore, the invention makes it possible to prevent electrostatic damage to the insulating layer disposed between the shield layer and the electrode layer connected to the magnetoresistive element, with a simple structure and simple manufacturing steps.

Furthermore, in the thin-film magnetic head or the method of manufacturing the same according to the invention, the semiconductor layer may be disposed between the vicinity of an end of the electrode layer, the end being located farther from the medium facing surface, and at least one of the shield layers. In this case, there is allowed a wide choice of thickness of the semiconductor layer.

Obviously many modifications and variations of the present invention are possible in the light of the above teachings. It is therefore to be understood that within the range of equivalency of the appended claims the present invention may be carried out otherwise than as specifically described.

What is claimed is:

1. A magnetoresistive device comprising:
    a magnetoresistive element that detects a magnetic field;
    two electrode layers for feeding a current for detecting the magnetic field to the magnetoresistive element;
    a first shield layer and a second shield layer that sandwich and shield the magnetoresistive element and the electrode layers;
    a first insulating layer disposed between the magnetoresistive element/the electrode layers and the first shield layer;
    a second insulating layer disposed between the magnetoresistive element/the electrode layers and the second shield layer; and a single semiconductor layer that is made up of a single layer and disposed between one of the shield layers and the two electrode layers, for connecting both the electrode layers to the one of the shield layers.

2. A method of manufacturing a magnetoresistive device comprising: a magnetoresistive element that detects a magnetic field; two electrode layers for feeding a current for detecting the magnetic field to the magnetoresistive element; a first shield layer and a second shield layer that sandwich and shield the magnetoresistive element and the electrode layers; a first insulating layer disposed between the magnetoresistive element/the electrode layers and the first shield layer; and a second insulating layer disposed between the magnetoresistive element/the electrode layers and the second shield layer, the method comprising the steps of:

forming the first shield layer;

forming the first insulating layer on the first shield layer;

forming the magnetoresistive element and the electrode layers on the first insulating layer;

forming the second insulating layer on the magnetoresistive element and the electrode layers;

forming the second shield layer on the second insulating layer; and forming a single semiconductor layer that is made up of a single layer and disposed between one of the shield layers and the two electrode layers, for connecting both the electrode layers to the one of the shield layers.

3. A thin-film magnetic head comprising:

a medium facing surface that faces toward a recording medium;

a magnetoresistive element that detects a magnetic field from the recording medium;

two electrode layers for feeding a current for detecting the magnetic field to the magnetoresistive element;

a first shield layer and a second shield layer that sandwich and shield the magnetoresistive element and the electrode layers;

a first insulating layer disposed between the magnetoresistive element/the electrode layers and the first shield layer;

a second insulating layer disposed between the magnetoresistive element/the electrode layers and the second shield layer; and a single semiconductor layer that is made up of a single layer and disposed between one of the shield layers and the two electrode layers, for connecting both the electrode layers to the one of the shield layers.

4. A thin-film magnetic head according to claim 3, wherein the semiconductor layer is disposed between the one of the shield layers and the vicinity of ends of the electrode layers, the ends being located farther from the medium facing surface.

5. A method of manufacturing a thin-film magnetic head comprising: a medium facing surface that faces toward a recording medium; a magnetoresistive element that detects a magnetic field from the recording medium; two electrode layers for feeding a current for detecting the magnetic field to the magnetoresistive element; a first shield layer and a second shield layer that sandwich and shield the magnetoresistive element and the electrode layers; a first insulating layer disposed between the magnetoresistive element/the electrode layers and the first shield layer; and a second insulating layer disposed between the magnetoresistive element/the electrode layers and the second shield layer, the method comprising the steps of:

forming the first shield layer;

forming the first insulating layer on the first shield layer;

forming the magnetoresistive element and the electrode layers on the first insulating layer;

forming the second insulating layer on the magnetoresistive element and the electrode layers;

forming the second shield layer on the second insulating layer; and forming a single semiconductor layer that is made up of a single layer and disposed between one of the shield layers and the two electrode layers, for connecting both the electrode layers to the one of the shield layers.

6. A method of manufacturing a thin-film magnetic head according to claim 5, wherein the semiconductor layer is disposed between the one of the shield layers and the vicinity of ends of the electrode layers, the ends being located farther from the medium facing surface.

* * * * *